United States Patent
Takahashi et al.

(10) Patent No.: US 9,678,772 B2
(45) Date of Patent: Jun. 13, 2017

(54) SYSTEM, METHOD, AND COMPUTER-READABLE MEDIUM

(71) Applicant: FUJITSU LIMITED, Kawasaki-shi, Kanagawa (JP)

(72) Inventors: Masaru Takahashi, Ota (JP); Shinichi Takaike, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 14/186,975

(22) Filed: Feb. 21, 2014

(65) Prior Publication Data

US 2014/0298329 A1 Oct. 2, 2014

(30) Foreign Application Priority Data

Mar. 26, 2013 (JP) ................................. 2013-064288

(51) Int. Cl.
*G06F 9/455* (2006.01)

(52) U.S. Cl.
CPC .............................. *G06F 9/45533* (2013.01)

(58) Field of Classification Search
CPC .................................................. G06F 9/45533
See application file for complete search history.

(56) References Cited

U.S. PATENT DOCUMENTS

| 7,047,313 | B1* | 5/2006 | Broerman ............... H04L 29/06 709/238 |
| 2002/0087721 | A1* | 7/2002 | Sato .................. H04L 29/12009 709/238 |
| 2013/0198746 | A1* | 8/2013 | Kruglick ............. G06F 9/45558 718/1 |
| 2015/0193256 | A1* | 7/2015 | Vittal .................... G06F 9/5072 718/1 |
| 2016/0164897 | A1* | 6/2016 | Rubin ................... G06F 21/554 726/23 |

FOREIGN PATENT DOCUMENTS

JP 2004-234401 8/2004

* cited by examiner

*Primary Examiner* — Li B Zhen
*Assistant Examiner* — Amir Soltanzadeh
(74) *Attorney, Agent, or Firm* — Oblon, McClelland, Maier & Neustadt, L.L.P.

(57) ABSTRACT

A system includes circuitry configured to receive a request to diagnose a first virtual machine coupled to a first network, the first virtual machine being identified in the first network based on a first address and identified in a second network based on a second address; transmit, to a to a router coupled between the first network and the second network, a request that an association be made between a third address and the first address based on the first request; and diagnose the first virtual machine via the router based on the third address, the third address being translated into the first address by the router based on the association.

20 Claims, 24 Drawing Sheets

FIG. 4

| GLOBAL IP ADDRESS | PRIVATE IP ADDRESS |
|---|---|
| 88.23.224.51 | 192.168.1.14 |
| 88.23.224.52 | 192.168.2.14 |
| 88.23.224.61 | 192.168.1.15 |
| 88.23.224.62 | 192.168.2.15 |
| ⋮ | ⋮ |

FIG. 7

| GLOBAL IP ADDRESS | PRIVATE IP ADDRESS |
|---|---|
| 88.23.1.51 | 192.168.1.14 |
| 88.23.224.52 | 192.168.2.14 |
| 88.23.224.61 | 192.168.1.15 |
| 88.23.224.62 | 192.168.2.15 |
| ⋮ | ⋮ |

FIG. 11

| USER ID | USER CODE | PASSWORD | AUTHORITY |
|---------|-----------|----------|-----------|
| U01 | ABC | k9g3 | DIAGNOSIS ENABLED |
| U01 | KLM | 6yk4 | DIAGNOSIS DISABLED |
| U02 | STU | ku76 | DIAGNOSIS ENABLED |
| U02 | XYZ | 9ikw | DIAGNOSIS DISABLED |

FIG. 12

| USER ID | VLAN ID | VIRTUAL MACHINE INFORMATION | | | VIRTUAL MACHINE INFORMATION | | |
|---|---|---|---|---|---|---|---|
| | | VIRTUAL MACHINE NAME | GLOBAL IP ADDRESS | PRIVATE IP ADDRESS | VIRTUAL MACHINE NAME | GLOBAL IP ADDRESS | PRIVATE IP ADDRESS |
| U01 | 14 | HOST123 | 88.23.224.51 | 192.168.1.14 | HOST124 | 88.23.224.52 | 192.168.2.14 |
| U02 | 15 | HOST456 | 88.23.224.61 | 192.168.1.15 | HOST457 | 88.23.224.62 | 192.168.2.15 |

FIG. 14

| USAGE FLAG | IP ADDRESS FOR DIAGNOSIS |
|---|---|
| ON | 88.23.1.51 |
| OFF | 88.23.1.52 |
| OFF | 88.23.1.61 |
| OFF | 88.23.1.62 |
| ⋮ | ⋮ |

FIG. 15

| USER ID | VLAN ID | VIRTUAL MACHINE INFORMATION | | | | VIRTUAL MACHINE INFORMATION | | | |
|---|---|---|---|---|---|---|---|---|---|
| | | VIRTUAL MACHINE NAME | GLOBAL IP ADDRESS | PRIVATE IP ADDRESS | IP ADDRESS FOR DIAGNOSIS | VIRTUAL MACHINE NAME | GLOBAL IP ADDRESS | PRIVATE IP ADDRESS | IP ADDRESS FOR DIAGNOSIS |
| U01 | 14 | HOST123 | 88.23.224.51 | 192.168.1.14 | 88.23.1.51 | HOST124 | 88.23.224.52 | 192.168.2.14 | NOT SET |

FIG. 16

| VIRTUAL MACHINE NAME | DIAGNOSIS ITEM | FIRST DIAGNOSIS REQUIREMENT | SECOND DIAGNOSIS REQUIREMENT | RECORD FILE |
|---|---|---|---|---|
| HOST123 | PORT SCAN | TCP SCAN | 20-1024 | /var/www/scan123.log |

SYSTEM, METHOD, AND COMPUTER-READABLE MEDIUM

CROSS-REFERENCE TO RELATED APPLICATION

This application is based upon and claims the benefit of priority of the prior Japanese Patent Application No. 2013-064288, filed on Mar. 26, 2013, the entire contents of which are incorporated herein by reference.

FIELD

The embodiments discussed herein are related to a system, a method and a computer-readable medium.

BACKGROUND

An information system that is coupled to the Internet has a risk of receiving attacks from externals. In order to reduce the risk, the security of the information system is verified.

For an on-premise system in which a device and software are installed in a facility managed by a user and that is operated, a system engineer manages all of hardware, a platform, and the software and comprehensively verifies the security of the system.

For an information system that uses a cloud service, a service provider manages hardware and a platform. It is, therefore, difficult for a user to recognize the security of an environment that is used by the user.

Japanese Laid-open Patent Publication No. 2004-234401 is an example of related art.

SUMMARY

According to an aspect of the invention, a system includes circuitry configured to receive a request to diagnose a first virtual machine coupled to a first network, the first virtual machine being identified in the first network based on a first address and identified in a second network based on a second address; transmit, to a to a router coupled between the first network and the second network, a request that an association be made between a third address and the first address based on the first request; and diagnose the first virtual machine via the router based on the third address, the third address being translated into the first address by the router based on the association.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a network address translation (NAT) table in a normal state;

FIG. 7 is a diagram illustrating an example of the NAT table to be used for diagnosis;

FIG. 11 is a diagram illustrating an example of a user information table;

FIG. 12 is a diagram illustrating an example of a virtual local area network (LAN) information table of the receiving server;

FIG. 14 is a diagram illustrating an example of an Internet Protocol (IP) address table for diagnosis;

FIG. 15 is a diagram illustrating an example of a virtual LAN information table of the diagnosing server;

FIG. 16 is a diagram illustrating an example of a diagnosis instruction;

DESCRIPTION OF EMBODIMENTS

First Embodiment

Figure 1:
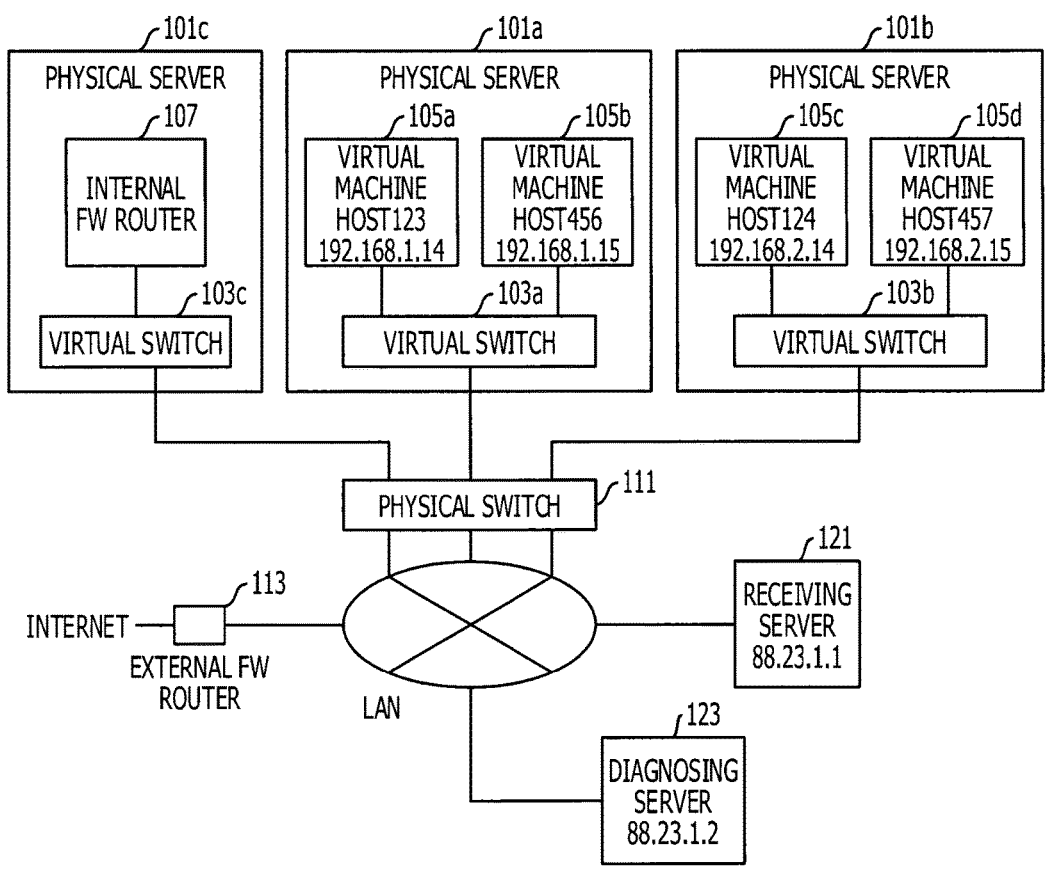
FIG. 1 is a diagram illustrating the outline of a physical network of a cloud system.

First, a network environment of a cloud system is described. FIG. 1 illustrates the outline of a physical network of the cloud system.

A physical server 101a, a physical server 101b, and a physical server 101c are coupled to a LAN through a physical switch 111. A receiving server 121 that receives a request from a user terminal is coupled to the LAN. A diagnosing server 123 that diagnoses a virtual machine 105 is coupled to the LAN. An external firewall (FW) router 113 is provided at a boundary between the Internet and the LAN. The external FW router 113 has a firewall function and a router function.

The physical server 101a has a virtual machine 105a and a virtual machine 105b that are coupled to a virtual switch 103a. The physical server 101b has a virtual machine 105c and a virtual machine 105d that are coupled to a virtual switch 103b. The virtual machines 105a to 105d are examples of virtual machines that are operated by users. A single user operates the virtual machines 105a and 105c, while another user operates the virtual machines 105b and 105d.

The number of virtual machines 105 included in each of the physical machine 101 is not limited to 2 and may be 1 or 3 or more. The number of physical servers 101 that each have a virtual machine 105 is not limited to 2 and may be 1 or 3 or more.

In the example illustrated in FIG. 1, the name of the virtual machine 105a is "HOST123", and a private IP address of the virtual machine 105a is "192.168.1.14". The name of the virtual machine 105b is "HOST456", and a private IP address of the virtual machine 105b is "192.168.1.15". The name of the virtual machine 105c is "HOST124", and a private IP address of the virtual machine 105c is "192.168.2.14". The name of the virtual machine 105d is "HOST457", and a private IP address of the virtual machine 105c is "192.168.2.15". A global IP address of the receiving server 121 is "88.23.1.1", and a global IP address of the diagnosing server 123 is "88.23.1.2".

The physical server 101c has an internal FW router 107. The internal FW router 107 operates as firewall and a router for a virtual LAN. In this example, the single internal FW router 107 is provided. If a plurality of virtual LANs are installed, a plurality of the internal FW routers 107 may be provided. The plurality of internal FW routers 107 may be provided in the same physical server 101 or may be provided in different physical servers 101.

The virtual machine 105a, the virtual machine 105c, the internal FW router 107, the receiving server 121, and the diagnosing server 123 are mainly described below.

Figure 2:
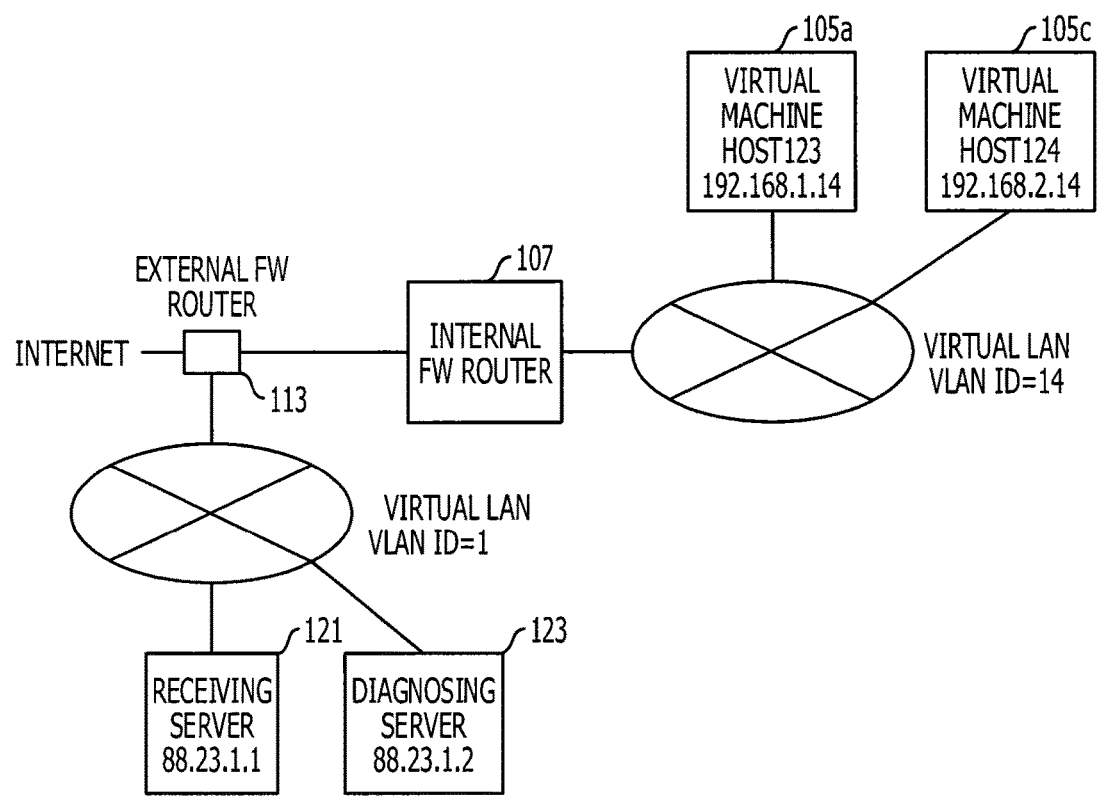
FIG. 2 is a diagram illustrating the outline of a logical network of the cloud system.

The cloud system includes virtual LANs on the premise of the aforementioned physical network. FIG. 2 illustrates the outline of a logical network of the cloud system.

The virtual machine 105a and the virtual machine 105c are coupled to a virtual LAN (having a virtual local area network identifier (VLAN ID) of 14) in this example. The internal FW router 107 routes data to the virtual LAN with the VLAN ID of 14. The virtual machine 105a and the virtual machine 105c communicate with an external through the internal FW router 107, the external FW router 113, and the Internet. The receiving server 121 and the diagnosing server 123 are coupled to another virtual LAN (having a VLAN ID of 1). The receiving server 121 communicates with the external through the external FW router 113 and the Internet. The diagnosing server 123 is coupled to the receiving server 121 through the virtual LAN with the VLAN ID of 1.

Next, sequences of the cloud system are described. First, a sequence of the cloud system when a user terminal 301 normally uses the virtual machine 105a through the Internet is described.

Figure 3:
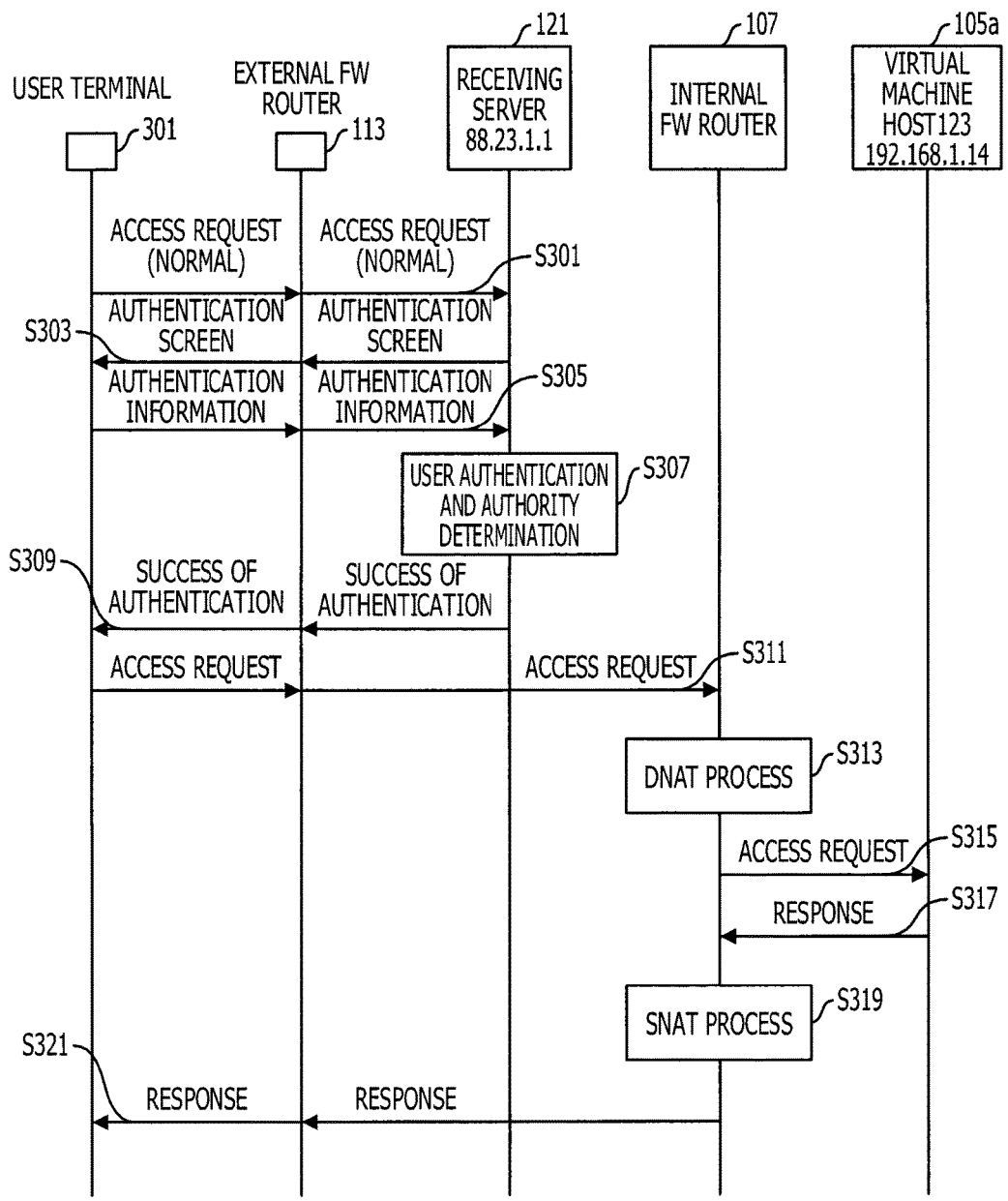
FIG. 3 is a diagram illustrating an example of a sequence when a virtual machine is normally used.

FIG. 3 illustrates an example of the sequence when the user terminal 301 normally uses the virtual machine 105a. It is assumed that the user terminal 301 has a function of connecting the user terminal 301 to the Internet. The user terminal 301 has an Internet browser. The user terminal 301 transmits a normal access request to the receiving server 121 (in S301). When receiving the access request through the external FW router 113, the receiving server 121 transmits data (web data) of an authentication screen to the user terminal 301 (in S303). The data of the authentication screen reaches the user terminal 301 through the external FW router 113. The Internet browser displays the authentication screen on the basis of the received data of the authentication screen. The authentication screen prompts a user to enter authentication information. The Internet browser transmits the received authentication information to the receiving server 121.

When receiving the authentication information through the external FW router 113 (in S305), the receiving server 121 executes a user authentication process and an authority determination process (in S307). In the user authentication process, if the received authentication information matches authentication information held by the receiving server 121, the receiving server 121 determines that the authentication is successful. In the authority determination process, the receiving server 121 determines the authority of the authenticated user. For the authority, an available function and available data are defined, for example. If the authority is not provided, the authority determination process may not be executed.

The receiving server 121 notifies the user terminal 301 of the success of the authentication through the external FW router 113 (in S309).

Then, the sequence transitions to a procedure for causing the user terminal 301 to use the virtual machine 105a. The user terminal 301 transmits a request to access the virtual machine 105a (in S311). The access request reaches the internal FW router 107 through the external FW router 113. The internal FW router 107 executes a destination network address translation (DNAT) process on the access request (in S313). The internal FW router 107 executes the DNAT process so as to translate a destination IP address of the access request to a private IP address. The internal FW router 107 has an NAT table that is used to translate an IP address.

FIG. 4 illustrates an example of the NAT table in a normal state. In the NAT table, a global IP address and a private IP address are associated with each other for each of the virtual machines 105 included in the virtual LANs. The global IP addresses are addresses to be used for connections to the Internet. The private IP addresses are addresses to be used for a private network (or the LAN in this example).

In the first record of the NAT table, a private IP address "192.168.1.14" of the virtual machine 105a and a global IP address "88.23.224.51" of the virtual machine 105a are associated with each other. In the second record of the NAT table, a private IP address "192.168.2.14" of the virtual machine 105c and a global IP address "88.23.224.52" of the virtual machine 105c are associated with each other. In the third record of the NAT table, a private IP address "192.168.1.15" of the virtual machine 105b and a global IP address "88.23.224.61" of the virtual machine 105b are associated with each other. In the fourth record of the NAT table, a private IP address "192.168.2.15" of the virtual machine 105d and a global IP address "88.23.224.62" of the virtual machine 105d are associated with each other.

In the DNAT process (in S313) illustrated in FIG. 3, if a destination IP address of a packet received from the external matches any of the global IP addresses indicated in the NAT table, the internal FW router 107 translates the destination IP address of the packet to a private IP address. In this example, the internal FW router 107 translates the original destination address "88.23.224.51" of the packet to the private IP address "192.168.1.14" of the virtual machine 105a.

The internal FW router 107 transfers the access request with the translated destination address to the virtual machine 105a (in S315).

The virtual machine 105a transmits a response to the access request (in S317). A destination address of the response is a source address of the access request. In this example, the address of the user terminal 301 is set to the destination address of the response. A source address of the response is the destination address of the access request. In this example, the private IP address "192.168.1.14" of the virtual machine 105a is set to the source address of the response.

When the response reaches the internal FW router 107, the internal FW router 107 executes a source network address translation (SNAT) process (in S319). The internal FW router 107 executes the SNAT process so as to translate the source IP address of the response to the global IP address. In this case, the internal FW router 107 uses the aforementioned NAT table.

In the SNAT process (S319), if a source address of a packet that goes out of the internal network matches any of the private IP addresses indicated in the NAT table, the internal FW router 107 translates the source address of the packet to a global IP address. In this example, the internal FW router 107 translates the original source address "192.168.1.14" of the response to the global IP address "88.23.224.51" of the virtual machine 105a.

The internal FW router 107 transfers the response with the translated source IP address (in S321). The response reaches the user terminal 301 through the external FW router 113.

The example in which the user terminal 301 normally uses the virtual machine 105a is described above. Next, the case where the virtual machine 105a is diagnosed in accordance with an instruction from the user terminal 301 is described below.

Figure 5:
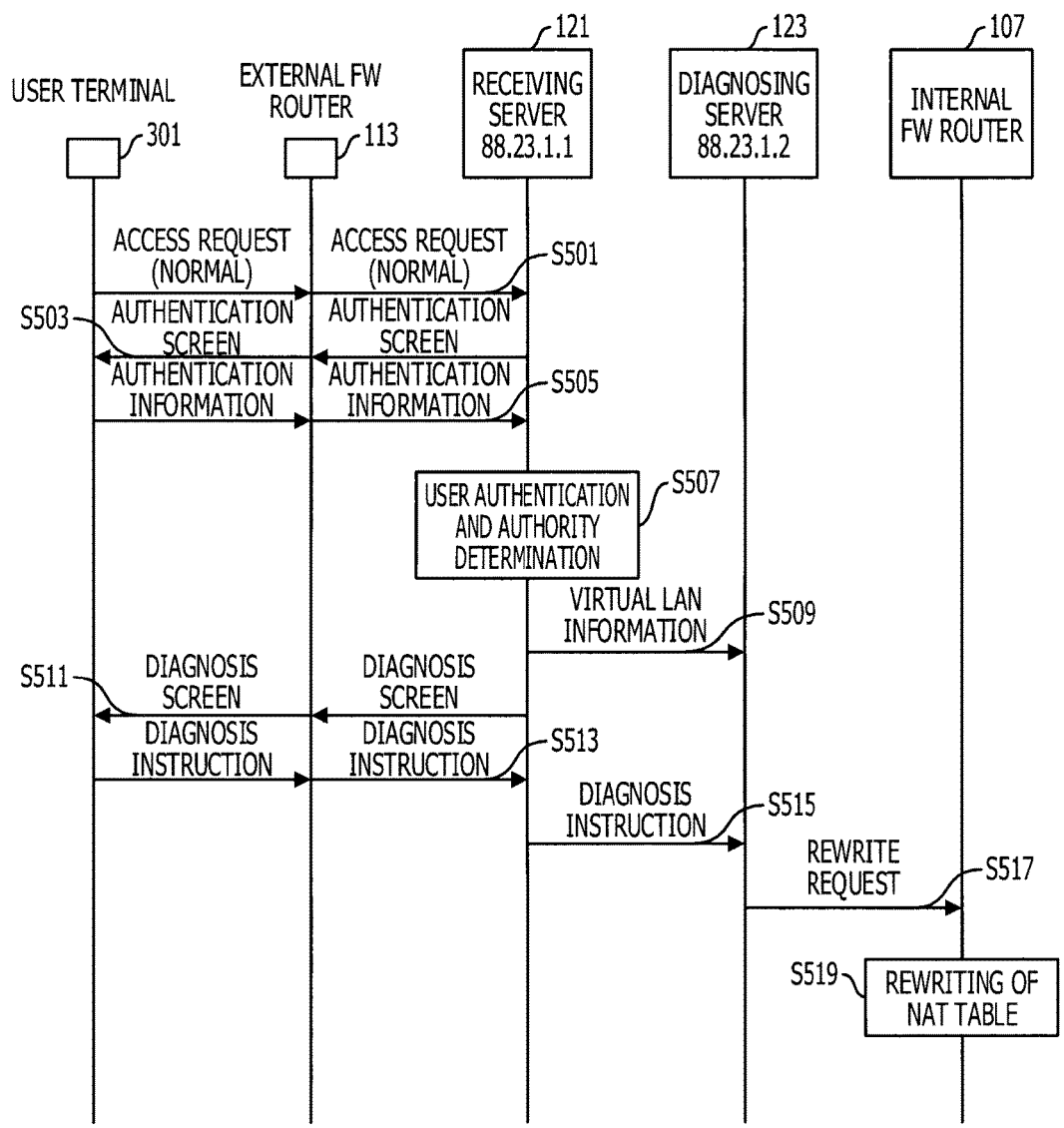
FIG. 5 is a diagram illustrating an example of a diagnosis sequence.

FIG. 5 illustrates an example of a diagnosis sequence. The user terminal 301 transmits an access request for diagnosis to the receiving server 121 (in S501). When receiving the access request through the external FW router 113, the receiving server 121 transmits the data of the authentication screen to the user terminal 301 through the external FW router 113 (in S503). In the same manner as described above, the data of the authentication screen reaches the user terminal 301 through the external FW router 113. The Internet browser displays the authentication screen on the basis of the received data of the authentication screen. The authentication screen prompts the user to enter authentication information. The Internet browser transmits the received authentication information to the receiving server 121.

When receiving the authentication information through the external FW router 113 (in S505), the receiving server 121 executes the user authentication process and the authority determination process (in S507). In the user authentication process, if the received authentication information matches the authentication information held by the receiving server 121, the receiving server 121 determines that the authentication is successful in the same manner as described above. In the authority determination process, the receiving server 121 determines the authority of the authenticated user. For the authority, whether or not a diagnosis is enabled to be executed is defined in this example. If the authority is not provided, the authority determination process may not be executed.

The receiving server 121 transmits virtual LAN information to the diagnosing server 123 (in S509). The virtual LAN information includes information on a virtual machine permitted to be used by the user and a virtual LAN that includes the virtual machine.

The receiving server 121 transmits data of a diagnosis screen to the user terminal 301 (in S511). The diagnosis screen is displayed by the Internet browser. The diagnosis screen is a screen for receiving a selection of a target to be diagnosed, an entry of details of a diagnosis, an instruction to execute a diagnosis, and an instruction to terminate a diagnosis.

Figure 6:
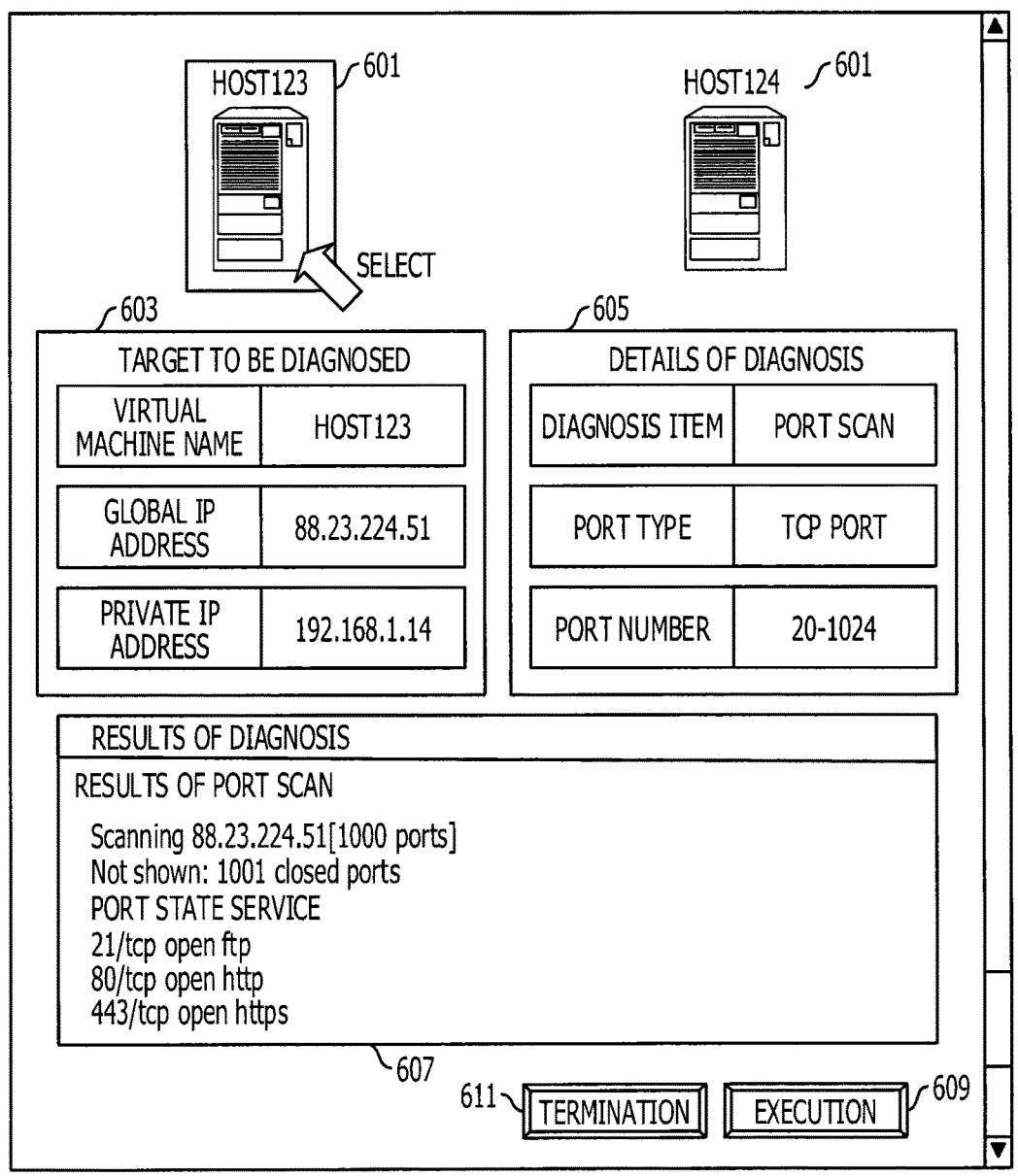
FIG. 6 is a diagram illustrating an example of a diagnosis screen.

FIG. 6 illustrates an example of the diagnosis screen. The diagnosis screen receives a selection of a target to be diagnosed. In this example, when an icon 601 of the virtual machine 105a to be diagnosed is clicked, the diagnosis screen receives the selection of the virtual machine 105a to be diagnosed. The diagnosis screen has a region 603 for displaying a virtual machine name, global IP address, and private IP address of a selected target to be diagnosed. In a region for displaying a virtual machine name, the name of a virtual machine to be diagnosed is displayed. In a region for displaying a global IP address, the global IP address of the virtual machine to be diagnosed is displayed. In a region for displaying a private IP address, the private IP address of the virtual machine to be diagnosed is displayed.

The diagnosis screen receives an entry of details of a diagnosis. The diagnosis screen has a region 605 for displaying entered details of a diagnosis. A diagnosis item is selected from a menu, for example. In this example, port scan for diagnosis is selected. Two display regions that are located under the diagnosis item indicate a first diagnosis requirement and a second diagnosis requirement. First and second diagnosis requirements are defined for each of diagnosis items. For the port scan, the first diagnosis requirement is a port type and the second diagnosis requirement is a port number. The first and second diagnosis requirements may be selected from a menu or may be set by entering numeric values.

As the diagnosis items, a diagnosis of an external public address, a diagnosis of the security of a password, a diagnosis of DoS (denial of service attack) attack countermeasures, a diagnosis of the security of a web application, and the like may be provided. In the diagnosis of an external public address, the usage status of a global IP address published on the Internet is detected, for example. In the diagnosis of the security of a password, tolerance to password cracking such as a dictionary attack is checked. In the diagnosis of DoS attack countermeasures, whether or not measures are taken against DoS attacks such as a Smurf attack, an SYN flood attack, and a ping of death is checked. In the diagnosis of the security of a web application, vulnerability such as cross-site scripting and vulnerability against SQL injection and the like are checked. In addition, another diagnosis item such as a diagnosis of the security of a database may be provided.

The diagnosis screen has a region 607 for displaying results of a diagnosis, an execution button 609 for providing an instruction (diagnosis instruction) to execute a diagnosis, and a termination button 611 for providing an instruction (termination instruction) to terminate a diagnosis. When the execution button 609 is clicked, an instruction to execute a diagnosis is provided, and results of the diagnosis are displayed in the region 607. In this example, results of the port scan are displayed in the region 607. When the termination button 611 is clicked, an instruction to terminate the diagnosis is provided, and the diagnosis screen is closed.

Returning to the sequence illustrated in FIG. 5, the Internet browser is executed so as to transmit a diagnosis instruction that indicates the target (to be diagnosed) selected by the diagnosis screen and the received details of the diagnosis. Thus, the user terminal 301 transmits the diagnosis instruction to the receiving server 121 (in S513).

When receiving the diagnosis instruction through the external FW router 113, the receiving server 121 transfers the diagnosis instruction to the diagnosing server 123 (in S515).

In the first embodiment, the diagnosing server 123 uses an IP address for diagnosis to diagnose the virtual machine 105*a*. Thus, the diagnosing server 123 transmits a request to rewrite the NAT table to the internal FW router 107 (in S517).

Specifically, the diagnosing server 123 transmits the request to change the global IP address of the virtual machine 105*a* to be diagnosed to the IP address for diagnosis. The IP address for diagnosis is a non-public IP address, for example. In this example, a global IP address obtained in advance is used as the IP address for diagnosis.

The internal FW router 107 rewrites the NAT table in accordance with the received rewrite request (in S519). In this manner, the NAT table is changed to the NAT table to be used for the diagnosis.

FIG. 7 illustrates an example of the NAT table to be used for the diagnosis. FIG. 7 illustrates the case where the virtual machine 105*a* is the target to be diagnosed. The global IP address "88.23.224 51", indicated in the first record, of the virtual machine 105*a* is translated to an IP address "88.23.1.51" for diagnosis. The private IP address indicated in the first record is not changed. The global IP address and private IP address of the virtual machine 105*c* that are indicated in the second record are not changed. The global IP address and private IP address of the virtual machine 105*b* that are indicated in the third record are not changed. The global IP address and private IP address of the virtual machine 105*d* that are indicated in the fourth record are not changed.

Figure 8:
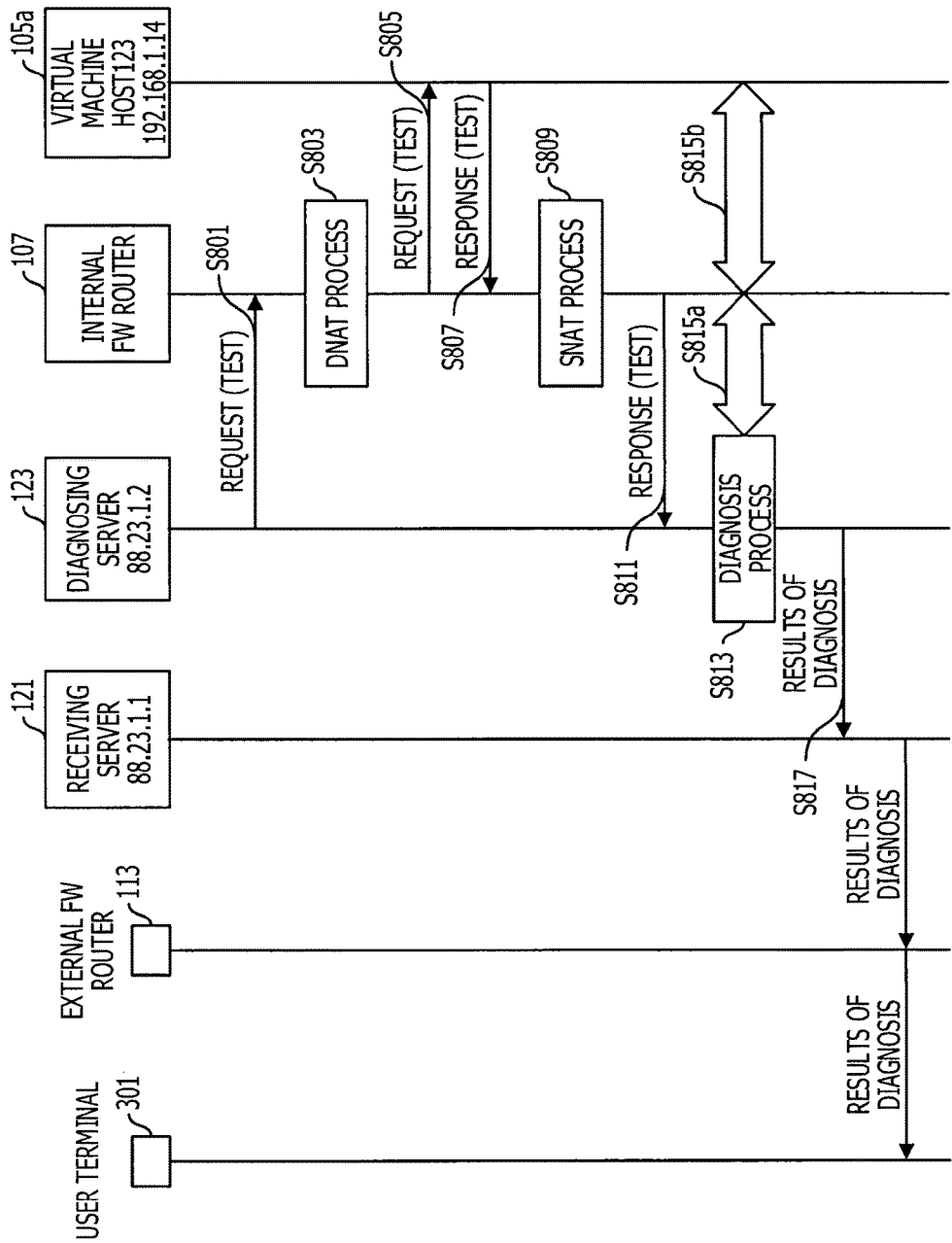
FIG. 8 is a diagram illustrating the example of the diagnosis sequence.

A sequence that is continued from the diagnosis sequence illustrated in FIG. 5 is described with reference to FIG. 8. The diagnosing server 123 executes a communication test in order to confirm that communication is executed in accordance with addresses set for the diagnosis. The sequence of the communication test is described below.

The diagnosing server 123 transmits a communication test request (in S801). In this case, the diagnosing server 123 sets the IP address for diagnosis to a destination IP address of a packet of the communication test request. In this example, the IP address "88.23.1.51" for diagnosis is set. The communication test request is relayed by the internal FW router 107.

When receiving the communication test request, the internal FW router 107 translates the destination IP address of the packet of the request to the private IP address (in S803). In this example, since the destination IP address "88.23.1.51" of the packet matches the global IP address "88.23.1.51" indicated in the first record of the NAT table illustrated in FIG. 7, the internal FW router 107 translates the destination IP address of the packet to the private IP address "192.168.1.14". Then, the internal FW router 107 transfers the communication test request to the virtual machine 105*a* (in S805).

The virtual machine 105*a* transmits a response to the received communication test request (in S807). A destination address of the response is the source address of the communication test request. Specifically, the address of the diagnosing server 123 is set to the destination address of the response. The source address of the response is the destination address of the communication test request. Specifically, the private IP address of the virtual machine 105*a* is set to the source address of the response. The response is relayed by the internal FW router 107.

When receiving the response, the internal FW router 107 executes the SNAT process so as to translate the source IP address of the response to the global IP address (in S809). In this example, since the source IP address "192.168.1.14" of the packet matches the private IP address "192.168.1.14" indicated in the first record of the NAT table illustrated in FIG. 7, the internal FW router 107 translates the source IP address of the packet to the global IP address "88.23.1.51" indicated in the first record. Then, the internal FW router 107 transfers the response to the diagnosing server 123 (in S811).

The diagnosing server 123 determines, on the basis of the reception of the response, that the virtual machine 105*a* is normally executed, and the diagnosing server 123 terminates the communication test. When the communication test is terminated, the diagnosing server 123 executes a diagnosis process in accordance with the details of the diagnosis (in S813). The diagnosing server 123 sets the IP address for diagnosis to the destination IP address of a packet to be transmitted and used for diagnosis and accesses the virtual machine 105*a*. The diagnosing server 123 checks the execution, state, and the like of the virtual machine 105*a* by this communication.

In the communication executed for the diagnosis and indicated by S815*a* and S815*b*, the DNAT process and the SNAT process are executed in the same manner as the communication test. Specifically, the internal FW router 107 executes the same address translation as the DNAT process of S803 on the packet output from the diagnosing server 123. In addition, the internal FW router 107 executes the same address translation as the SNAT process of S809 on a packet output from the virtual machine 105*a*.

When the diagnosis process is terminated, the diagnosing server 123 transmits results of the diagnosis to the receiving server 121 (in S817). The receiving server 121 transfers the results of the diagnosis to the user terminal 301 (in S819). The results of the diagnosis are displayed on the diagnosis screen of the user terminal 301.

Figure 9:
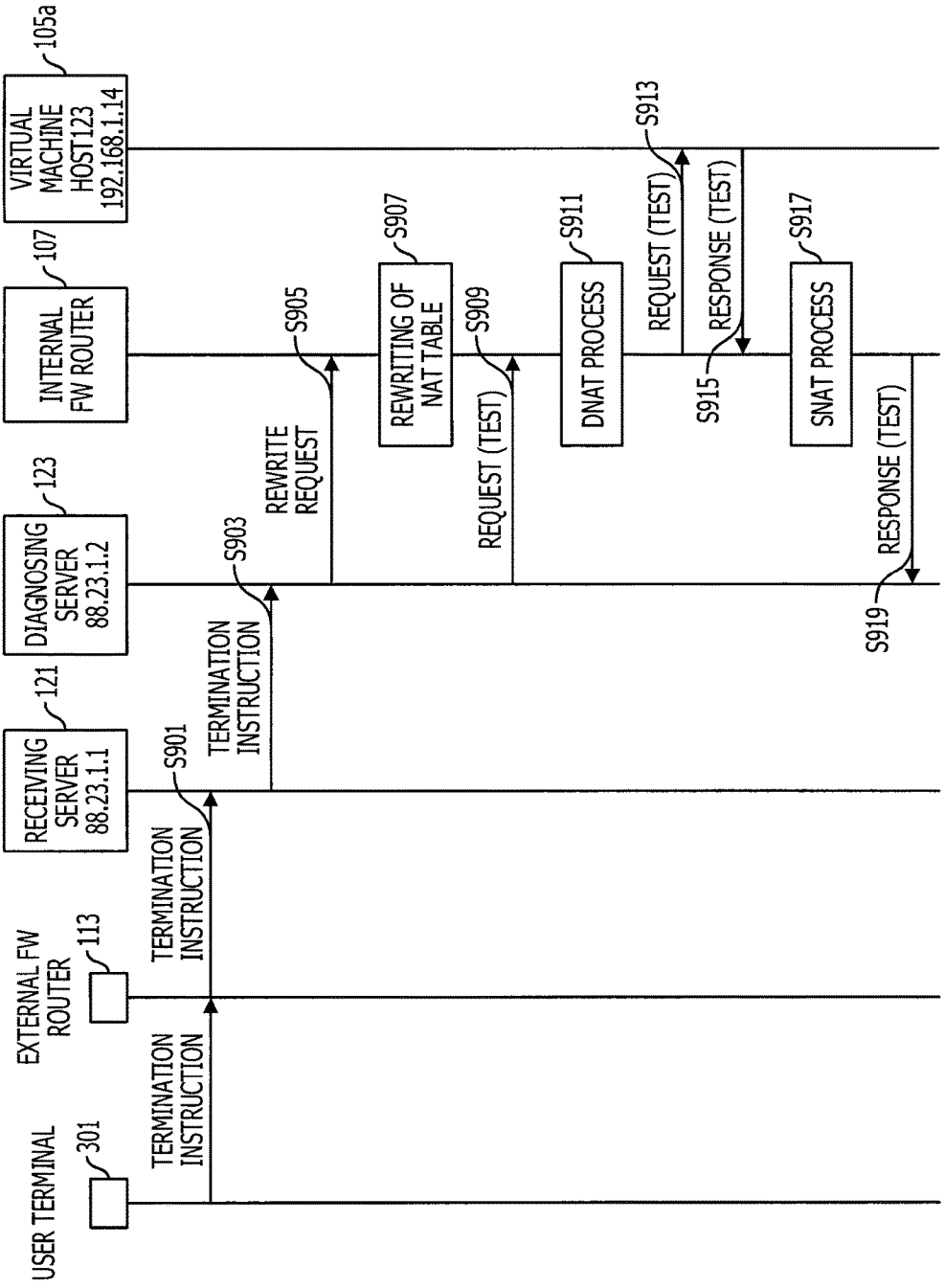
FIG. 9 is a diagram illustrating the example of the diagnosis sequence.

A sequence that is continued from the diagnosis sequence illustrated in FIG. 8 for the termination of the diagnosis is described with reference to FIG. 9. The user terminal 301 transmits an instruction to terminate the diagnosis to the receiving server 121 (in S901). When receiving the termination instruction through the external FW router 113, the receiving server 121 transfers the termination instruction to the diagnosing server 123 (in S903).

The diagnosing server 123 transmits, to the internal FW router 107, a rewrite request to restore the NAT table to the normal state (in S905). Specifically, the diagnosing server 123 transmits the request to change the global IP address of the virtual machine 105*a* to be diagnosed to the original global IP address.

The internal FW router 107 rewrites the NAT table in accordance with the received rewrite request (in S907). In this manner, the NAT table is changed to the normal state. In this example, the NAT table illustrated in FIG. 7 and used for the diagnosis is changed to the normal state illustrated in FIG. 4.

The diagnosing server 123 executes a communication test to confirm whether or not the virtual machine 105*a* is restored to a normal state. The diagnosing server 123 transmits a communication test request (in S909). The diagnosing server 123 sets the original global IP address to a destination address of a packet of the communication test request. In this example, the global IP address "88.23.224.51" of the virtual machine 105*a* is set. The communication test request is relayed by the internal FW router 107.

When receiving the communication test request, the internal FW router 107 executes the DNAT process so as to translate the destination IP address of the packet of the request to the private IP address (in S911). In this example, since the destination IP address "88.23.224.51" of the packet matches the global IP address "88.23.224.51" indicated in the first record of the NAT table illustrated in FIG. 4, the internal FW router 107 translates the destination IP address of the packet to the private IP address "192.168.1.14". Then, the internal FW router 107 transfers the communication test request to the virtual machine 105a (in S913).

The virtual machine 105a transmits a response to the received communication test request (in S915). A destination address of the response is the source address of the communication test request. Specifically, the address of the diagnosing server 123 is set to the destination address of the response. The source address of the response is the destination address of the communication test request. Specifically, the private IP address of the virtual machine 105a is set to the source address of the response. The response is relayed by the internal FW router 107.

When receiving the response, the internal FW router 107 executes the SNAT process so as to translate the source IP address of the response to the global IP address (in S917). In this example, since the source IP address "192.168.1.14" of the packet matches the private IP address "192.168.1.14" indicated in the first record of the NAT table illustrated in FIG. 4, the internal FW router 107 translates the source IP address of the packet to the global IP address "88.23.224.51" indicated in the first record. Then, the internal FW router 107 transfers the response to the diagnosing server 123 (in S919).

When receiving the response, the diagnosing server 123 determines that the virtual machine 105a is normally executed, and the diagnosing server 123 terminates the process. The description of the sequence is finished.

Figure 10:
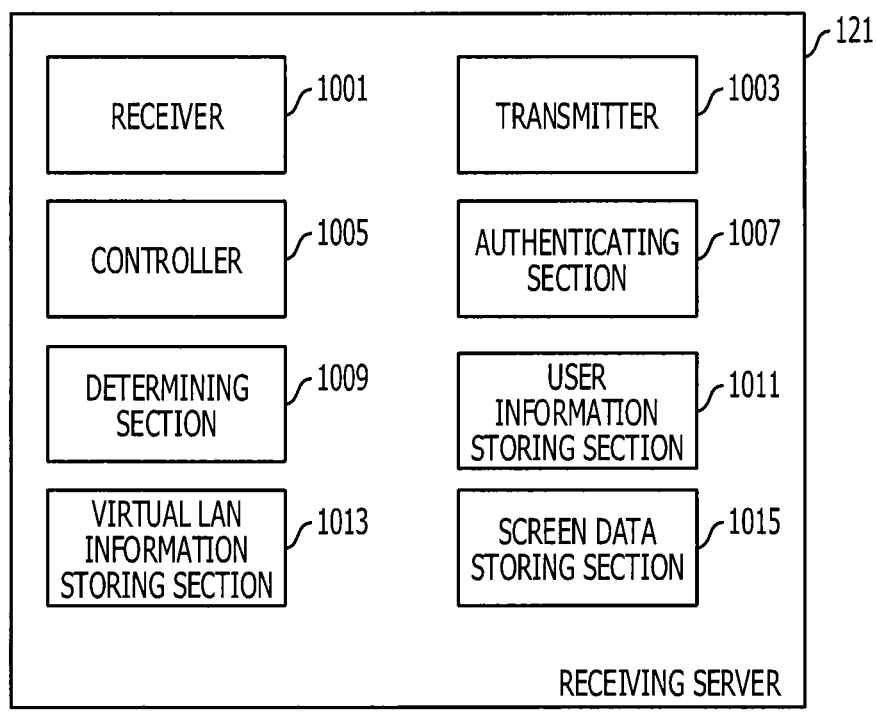
FIG. 10 is a diagram illustrating an example of a module configuration of a receiving server.

Next, module configurations are described. First, a module configuration of the receiving server 121 is described. FIG. 10 illustrates an example of the module configuration of the receiving server 121. The receiving server 121 includes a receiver 1001, a transmitter 1003, a controller 1005, an authenticating section 1007, a determining section 1009, a user information storing section 1011, a virtual LAN information storing section 1013, and a screen data storing section 1015.

The receiver 1001 receives data from the LAN. In this example, the receiver 1001 receives a packet through the LAN in accordance with the Transmission Control Protocol (TCP) and the Internet Protocol (IP). The transmitter 1003 transmits data to the LAN. In this case, the transmitter 1003 transmits a packet through the LAN in accordance with the TCP and the IP. The controller 1005 receives an instruction from a user, relays the instruction to the diagnosing server 123, and the like. The authenticating section 1007 executes the user authentication process. The determining section 1009 determines the authority of the user. The user information storing section 1011 stores a user information table in advance.

FIG. 11 illustrates an example of the user information table. The user information table has records for users. The records each have fields for a user ID, a user code, a password, and authority. The user ID is information that identifies a user for an internal process. The user code is a code assigned to the user. The password is a secret code that people other than the user do not know. The authority is the authority of the user for the cloud system. In this example, "diagnosis enabled" is set for a user who has authority to provide an instruction to execute a diagnosis, and "diagnosis disabled" is set for a user who does not have the authority to provide an instruction to execute a diagnosis.

Returning to FIG. 10, the virtual LAN information storing section 1013 stores a virtual LAN information table. Virtual LAN information includes information of a virtual LAN, a user of the virtual LAN, and a virtual machine included in the virtual LAN.

FIG. 12 illustrates an example of the virtual LAN information table of the receiving server 121. The virtual LAN information table has records for virtual LANs set in the cloud system. The records each have fields for a user ID, a VLAN ID, and one or more information groups of virtual machine information. The user ID is the ID of a user who operates a virtual machine 105 that belongs to an interested virtual LAN. The VLAN ID is the ID of the interested virtual LAN. The virtual machine information includes the name, global IP address, and private IP address of the virtual machine that belongs to the interested virtual LAN.

Returning to FIG. 10, the screen data storing section 1015 stores the data of the diagnosis screen.

Figure 13:
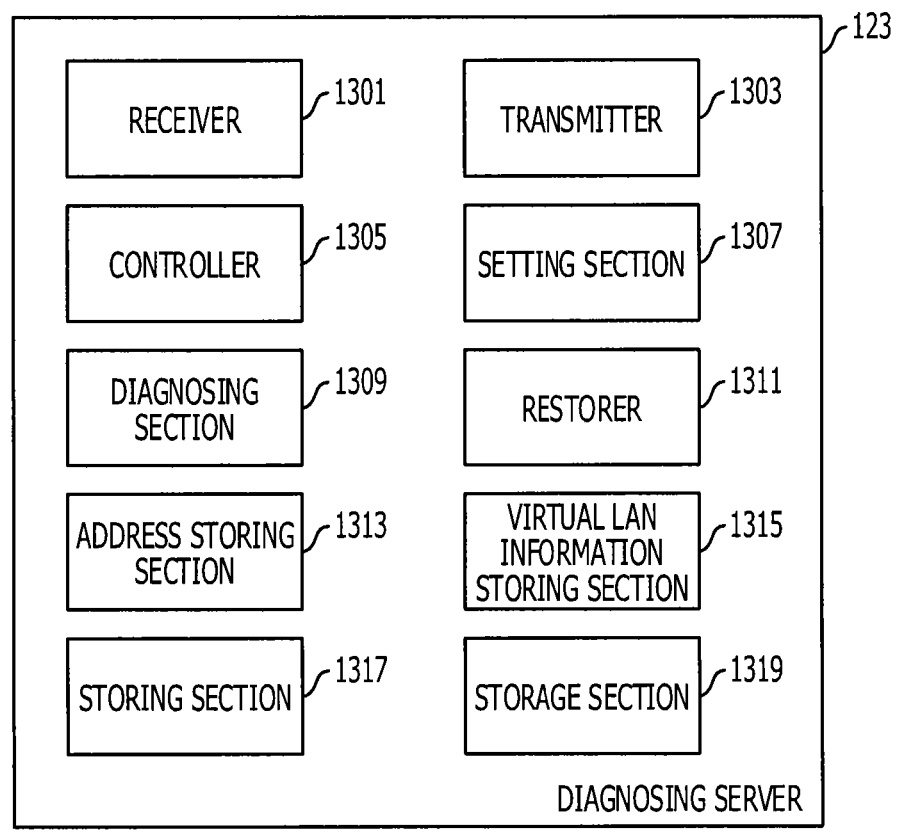
FIG. 13 is a diagram illustrating an example of a module configuration of a diagnosing server.

Next, a module configuration of the diagnosing server 123 is described. FIG. 13 illustrates an example of the module configuration of the diagnosing server 123. The diagnosing server 123 includes a receiver 1301, a transmitter 1303, a controller 1305, a setting section 1307, a diagnosing section 1309, a restorer 1311, an address storing section 1313, a virtual LAN information storing section 1315, a storing section 1317, and a storage section 1319. The receiver 1301 receives data from the LAN. In this example, the receiver 1301 receives a packet through the LAN in accordance with the TCP and the IP. The transmitter 1303 transmits data to the LAN. In this example, the transmitter 1303 transmits a packet through the LAN in accordance with the TCP and the IP.

The controller 1305 mainly controls operations related to a diagnosis. The setting section 1307 sets an address for diagnosis.

The diagnosing section 1309 diagnoses a virtual machine 105. Specifically, the diagnosing section 1309 includes processing sections for the diagnosis items such as the diagnosis of an external public address, the diagnosis of the security of a password, the diagnosis of DoS attack countermeasures, the diagnosis of the security of a web application, and the like. The processing sections are achieved by causing the diagnosing server 123 to execute diagnosis programs for the diagnosis items.

The restorer 1311 restores an address. The address storing section 1313 stores an IP address table of IP addresses for diagnosis.

FIG. 14 illustrates an example of the IP address table. The IP address table stores IP addresses for diagnosis and usage flags associated with the IP addresses for diagnosis. The IP addresses for diagnosis are global IP addresses obtained in advance. If an IP address for diagnosis is not used for a diagnosis of a virtual machine 105, "OFF" is set to a usage flag associated with the IP address for diagnosis. If the IP address for diagnosis is used for the diagnosis of the virtual machine 105, "ON" is set to the usage flag associated with the IP address for diagnosis.

Returning to FIG. 13, the virtual LAN information storing section 1315 stores a virtual LAN information table of virtual LANs to be diagnosed. FIG. 15 illustrates an example of the virtual LAN information table of the diagnosing server 121. The virtual LAN information table has records for virtual LANs to be diagnosed. The records each have fields for a user ID, a VLAN ID, and virtual machine information. The virtual machine information includes one or more information groups. The user ID is the ID of a user who operates an interested virtual LAN to be diagnosed. The VLAN ID is the ID of the interested virtual LAN. The virtual machine information has fields for the name, global IP address, and private IP address of a virtual machine 105 belonging to the interested virtual LAN, and an IP address for diagnosis of the virtual machine 105. The IP address for diagnosis is an address assigned in order to diagnose the interested virtual machine 105. If the IP address for diagnosis is set, the address to be used to diagnose the virtual machine 105 is set in the NAT table. If the IP address for diagnosis is not set, the address to be used to diagnose the virtual machine 105 is not set in the NAT table.

Returning to FIG. 13, the storing section 1317 stores a diagnosis instruction and a record file. FIG. 16 illustrates an example of the diagnosis instruction. The diagnosis instruction includes information of a target to be diagnosed and information of details of a diagnosis. In this example, the target to be diagnosed is identified by a virtual machine name. In this example, the details of the diagnosis are identified by a first diagnosis requirement and a second diagnosis requirement. As illustrated in FIG. 16, the storing section 1317 may store the name of the record file.

Returning to FIG. 13, the storage section 1319 executes a process of causing the storing section 1317 to store the record file.

The description of the module configurations of the receiving server 121 and diagnosing server 123 is finished. Next, processes that are executed by the receiving server 121 and the diagnosing server 123 are described.

Figure 17A:
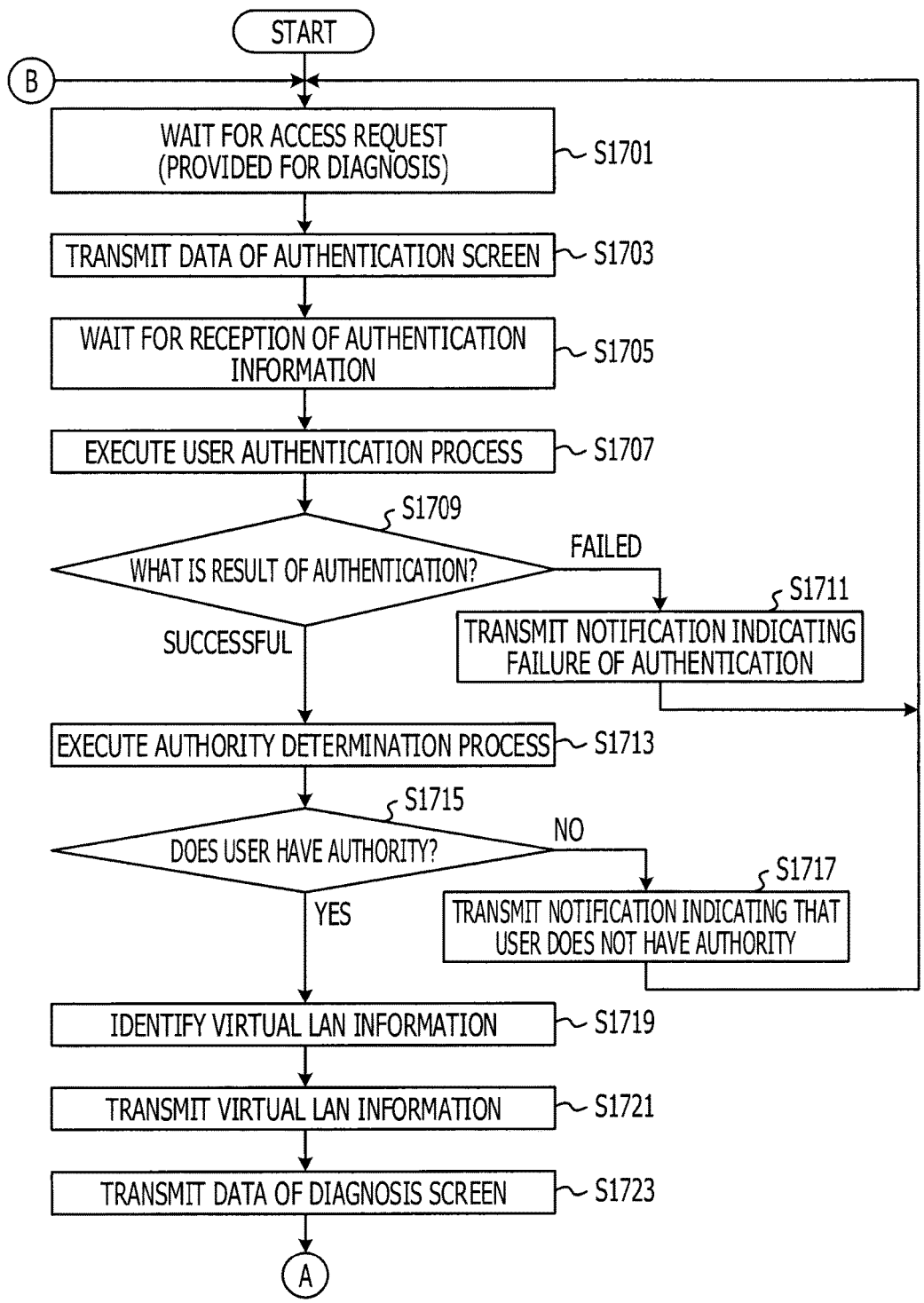
FIG. 17A is a diagram illustrating an example of the flow of a process to be executed by the receiving server.

FIG. 17A illustrates an example of the flow of the process to be executed by the receiving server 121. The controller 1005 waits for the receiver 1001 to receive an access request (in S1701). The access request is provided for diagnosis. When the receiver 1001 receives the access request, the transmitter 1003 transmits the data of the authentication screen to a source that has transmitted the access request (in S1703).

The controller 1005 waits for the receiver 1001 to receive authentication information (in S1705). The authentication information includes a user code and a password. When the receiver 1001 receives the authentication information, the authenticating section 1007 executes the user authentication process (in S1707). If a combination of the user code and the password that are included in the authentication information matches a combination of a user code and a password that are included in any of the records of the user information table stored in the user information storing section 1011, the authenticating section 1007 determines that the user authentication is successful. If the combination of the user code and the password that are included in the authentication information does not match a combination of a user code and a password that are included in any of the records of the user information table stored in the user information storing section 1011, the authenticating section 1007 determines that the user authentication is failed.

The controller 1005 branches off the process on the basis of the result of the authentication (in S1709). If the user authentication is failed, the transmitter 1003 transmits a notification indicating the failure of the user authentication to the source that has transmitted the access request (in S1711). Then, the process returns to the process of S1701.

If the user authentication is successful, the determining section 1009 executes the authority determination process (in S1713). If authority that is associated with a user code of the user in a record of the user information table indicates "diagnosis enabled", the determining section 1009 determines that the user has the authority. If the authority that is associated with the user code of the user in the record of the user information table indicates "diagnosis disabled", the determining section 1009 determines that the user does not have the authority.

The controller 1005 branches off the process on the basis of whether or not the user has the authority (in S1715). If the determining section 1009 determines that the user does not have the authority, the transmitter 1003 transmits a notification indicating that the user does not have the authority to the source that has transmitted the access request (in S1717). Then, the process returns to the process of S1701.

If the determining section 1009 determines that the user has the authority, the controller 1005 identifies virtual LAN information (in S1719). Specifically, the controller 1005 identifies a user ID associated with the user code in the record of the user information table. Then, the controller 1005 identifies a record including the user ID in the virtual LAN information table stored in the virtual LAN information storing section 1013 and identifies the virtual LAN information included in the identified record. The transmitter 1003 transmits the identified virtual LAN information to the diagnosing server 123 (in S1721).

Figure 18:
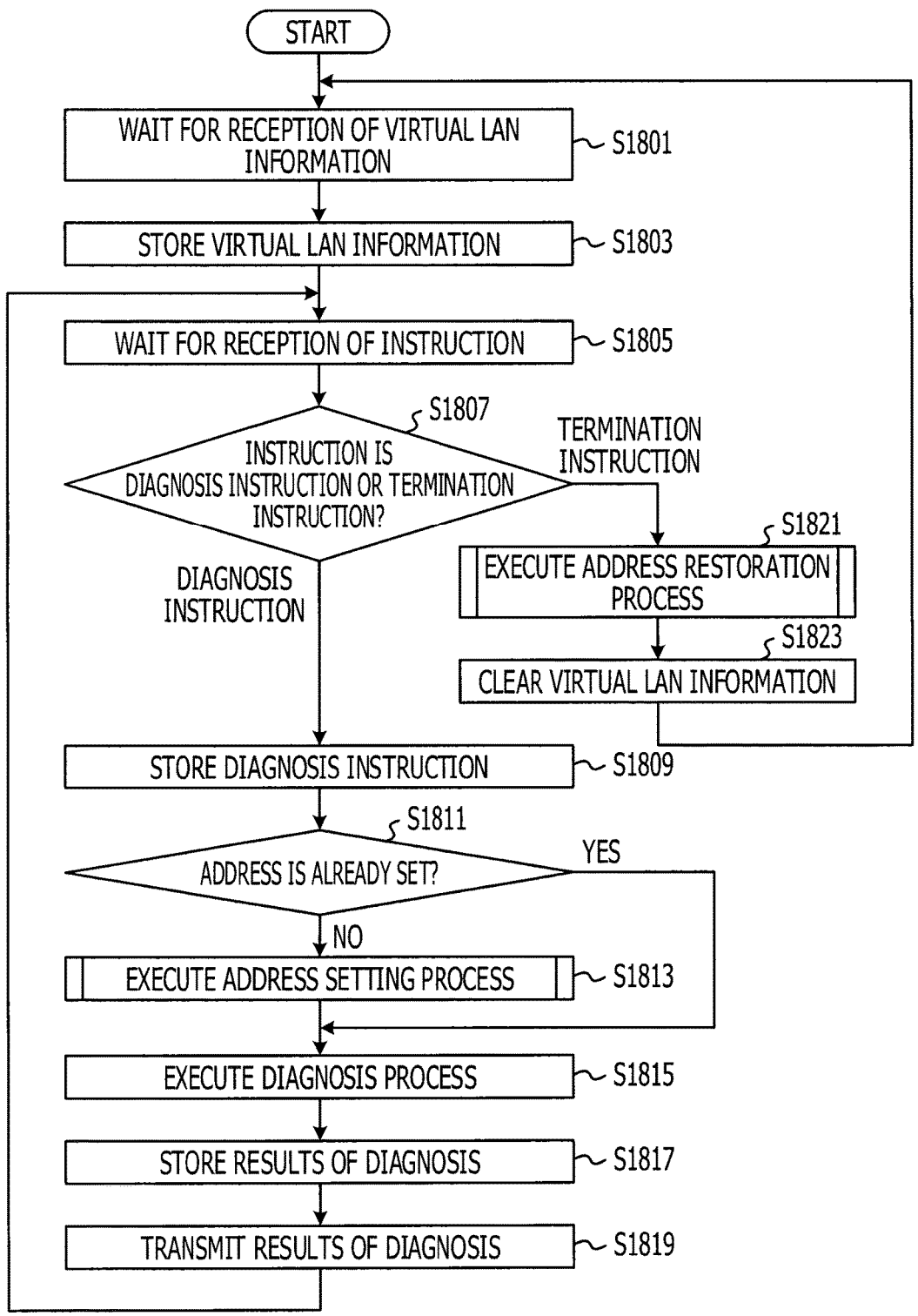
FIG. 18 is a diagram illustrating an example of the flow of a process to be executed by the diagnosing server.

The process that is executed by the diagnosing server 123 is described below. FIG. 18 illustrates an example of the flow of the process to be executed by the diagnosing server 123. The controller 1305 waits for the receiver 1301 to receive the virtual LAN information (in S1801). The controller 1305 causes the virtual LAN information storing section 1315 to store the virtual LAN information (in S1803).

Figure 17B:
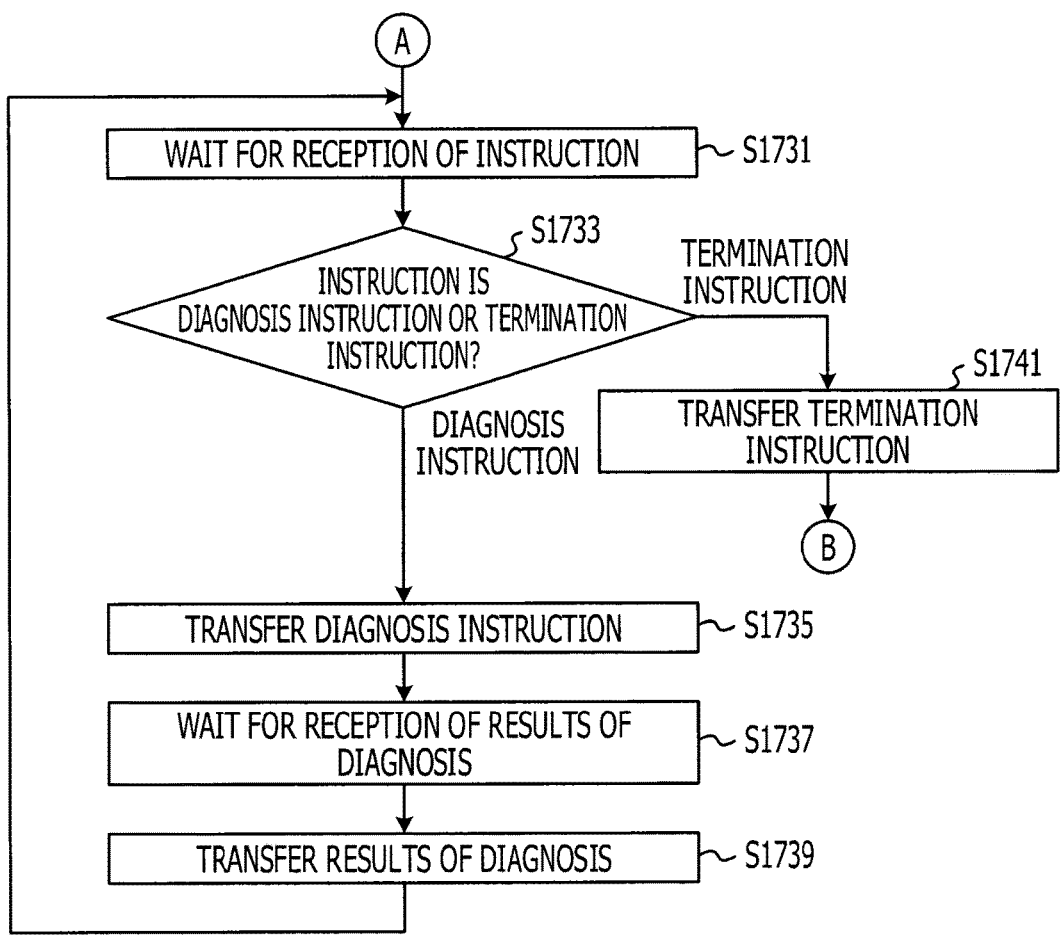
FIG. 17B is a diagram illustrating the example of the flow of the process to be executed by the receiving server.

Returning to FIG. 17A describing the process to be executed by the receiving server 121. The transmitter 1003 transmits the data of the diagnosis screen to the source that has transmitted the access request (in S1723). A process that is continued from the process illustrated in FIG. 17A and is executed by the receiving server 121 is described with reference to FIG. 17B. The controller 1005 waits for the receiver 1001 to receive an instruction (in S1731). When the receiver 1001 receives the instruction, the controller 1005 determines whether the received instruction is a diagnosis instruction or a termination instruction (in S1733). If the controller 1005 determines that the received instruction is the diagnosis instruction, the transmitter 1003 transfers the diagnosis instruction to the diagnosing server 123 (in S1735).

The process that is illustrated in FIG. 18 and executed by the diagnosing server 123 is described below. The controller 1305 waits for the receiver 1301 to receive an instruction (in S1805). The controller 1305 determines whether the received instruction is a diagnosis instruction or a termination instruction (in S1807). If the controller 1305 determines that the received instruction is the diagnosis instruction, the controller 1305 causes the storing section 1317 to store the diagnosis instruction (in S1809). The controller 1305 determines whether or not an IP address for diagnosis is already set (in S1811). Specifically, the controller 1305 identifies a virtual machine name included in the diagnosis instruction and identifies virtual machine information including the identified virtual machine name in the virtual LAN information table stored in the virtual LAN information storing section 1315. If an IP address for diagnosis that is included in the virtual machine information is set, the controller 1305 determines that the IP address for diagnosis is already set in the NAT table. If the IP address for diagnosis that is included in the virtual machine information is not set, the controller 1305 determines that the IP address for diagnosis is not set in the NAT table.

If the controller 1305 determines that the IP address for diagnosis is already set, the diagnosis process is executed (in S1815). If the controller 1305 determines that the IP address for diagnosis is not set, the setting section 1307 executes an address setting process before the diagnosis process of S1815 (in S1813).

Figure 19:
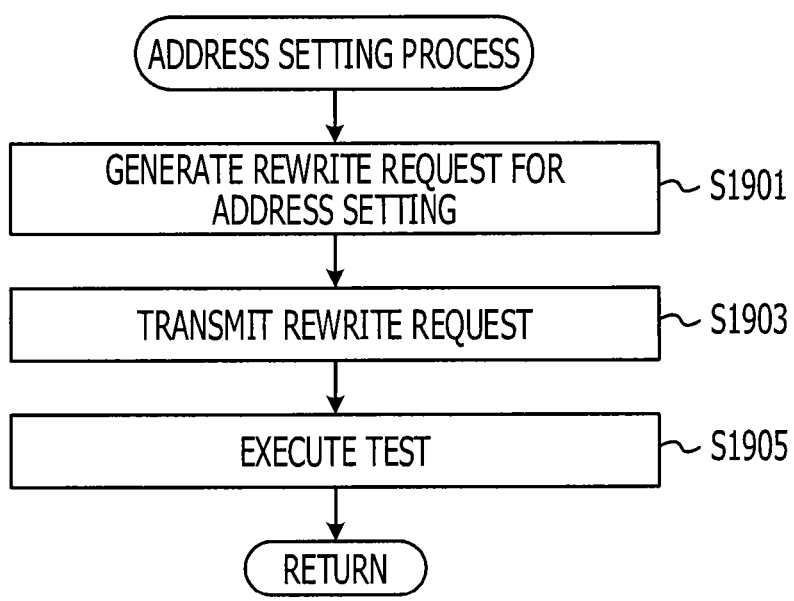
FIG. 19 is a diagram illustrating an example of the flow of an address setting process.

FIG. 19 illustrates an example of the flow of the address setting process. The setting section 1307 generates a rewrite request for address setting (in S1901). The rewrite request includes information that identifies a combination of IP addresses to be translated and a combination of new IP addresses.

Specifically, the setting section 1307 identifies the virtual machine name included in the diagnosis instruction and identifies the virtual machine information including the identified virtual machine name in the virtual LAN information table stored in the virtual LAN information storing section 1315. The setting section 1307 identifies a combination of the original global IP address and private IP address that are included in the identified virtual machine information.

Next, the setting section 1307 identifies an IP address for diagnosis that is associated with a usage flag indicating "OFF" in the IP address table stored in the address storing section 1313. Then, the setting section 1307 sets the identified IP address for diagnosis to a new global IP address and identifies a combination of the new global IP address and the aforementioned private IP address. In this case, the setting section 1307 changes the usage flag associated with the identified IP address for diagnosis to "ON".

The setting section 1307 uses the aforementioned information to generate the rewrite request for address setting. The setting section 1307 transmits the rewrite request to the internal FW router 107 (in S1903). The internal FW router 107 that receives the rewrite request identifies, on the basis of the rewrite request, the combination of the IP addresses to be translated. Then, the internal FW router 107 translates the identified combination of the IP addresses to the combination of the new IP addresses.

Then, the setting section 1307 executes the communication test (in S1905). As described above, the diagnosing server 123 transmits the access request to the IP address for diagnosis. If the diagnosing server 123 receives a response from a virtual machine 105 to be diagnosed, the diagnosing server 123 determines that the communication test is successful.

Returning to FIG. 18 describing the process, the diagnosing section 1309 executes the diagnosis process (in S1815). The diagnosing section 1309 selects a diagnosis program on the basis of a diagnosis item, sets the IP address for diagnosis to an IP address identifying the virtual machine 105 to be diagnosed, and executes the diagnosis program in accordance with diagnosis requirements. The diagnosis program uses the IP address for diagnosis as a destination, accesses the virtual machine 105, and executes the communication for diagnosis. When the execution of the diagnosis program is terminated, the storage section 1319 causes the storing section 1317 to store results of the diagnosis (S1817). Specifically, the diagnosing section 1309 causes the storing section 1317 to store a record file including the results of the diagnosis. In this case, a record file name may be associated with the diagnosis instruction stored in the storing section 1317 and may be stored, as illustrated in FIG. 16. The transmitter 1303 transmits the results of the diagnosis to the receiving server 121 (in S1819). Then, the process returns to the process of S1805.

Returning to FIG. 17B describing the process to be executed by the receiving server 121. The controller 1005 waits for the receiver 1001 to receive the results of the diagnosis (in S1737). When the receiver 1001 receives the results of the diagnosis, the transmitter 1003 transfers the results of the diagnosis to the source that has transmitted the access request (in S1739). Then, the process returns to the process of S1731.

If the controller 1005 determines that the received instruction is the termination instruction in S1733, the transmitter 1003 transfers the termination instruction (in S1741). Then, the process returns to the process of S1701 through a terminal B illustrated in FIG. 17B.

Returning to FIG. 18 describing the process to be executed by the diagnosing server 123. If the controller 1305 determines that the instruction received in S1805 is the termination instruction in S1807, the restorer 1311 executes an address restoration process (in S1821).

Figure 20:
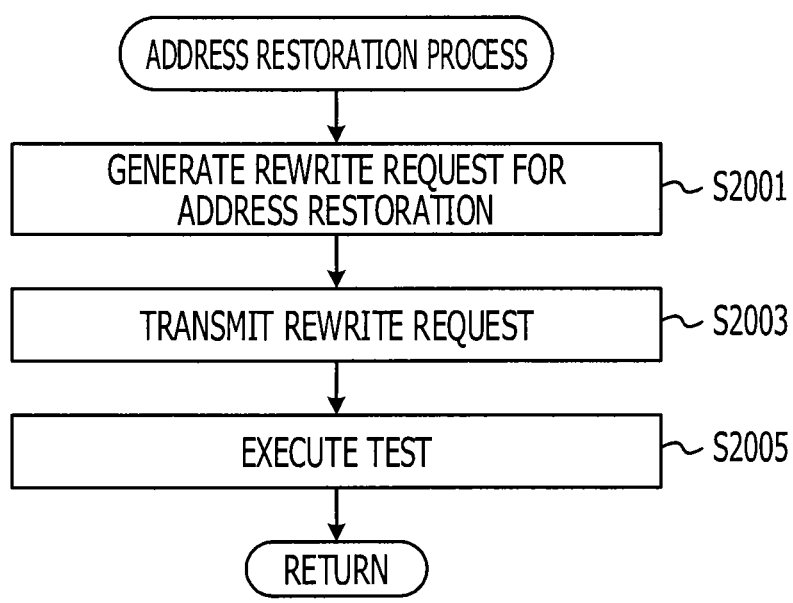
FIG. 20 is a diagram illustrating an example of the flow of an address restoration process.

FIG. 20 illustrates an example of the flow of the address restoration process. The restorer 1311 generates a rewrite request for address restoration (in S2001). In the same manner as described above, the rewrite request includes information that identifies a combination of IP addresses to be translated and a combination of new IP addresses.

Specifically, the setting section 1307 identifies a virtual machine name included in an instruction to execute a diagnosis already terminated and identifies virtual machine information including the identified virtual machine name in the virtual LAN information table stored in the virtual LAN information storing section 1315. The setting section 1307 sets a combination of an IP address for diagnosis and a private IP address that are included in the identified virtual machine information to the combination of the IP addresses to be translated. In addition, the setting section 1307 sets a combination of a global IP address and the private IP address that are included in the identified virtual machine information to the combination of the new IP addresses.

The restorer 1311 changes a usage flag associated with the IP address for diagnosis from "ON" to "OFF" in the IP address table stored in the address storing section 1313.

The restorer 1311 uses the aforementioned information to generate the rewrite request for address restoration.

The restorer 1311 transmits the rewrite request to the internal FW router 107 (in S2003). The internal FW router 107 that receives the rewrite request identifies the combination of the IP addresses to be translated on the basis of the rewrite request and translates the identified combination of the IP addresses to the combination of the new IP addresses. In this manner, an interested record of the NAT table is restored to the original state.

The restorer 1311 executes the communication test (in S2005). As described above, the diagnosing server 123 transmits the access request to the IP address for diagnosis. If the diagnosing server 123 receives a response from a virtual machine 105 to be diagnosed, the diagnosing server 123 determines that the communication test is successful.

Returning to FIG. 18 describing the process, the controller 1305 clears virtual LAN information including a virtual machine name included in the termination instruction (in S1823). Then, the process returns to S1801. The description of the processes that are executed by the receiving server 121 and the diagnosing server 123 is finished.

According to the first embodiment, since the diagnosing server 123 that is installed in the LAN to which access is limited by the external FW router 113 diagnoses a virtual machine 105 on the basis of access from the outside of the virtual machine 105, the diagnosing server 123 may diagnose the security on the assumption of access from an external without releasing the limit on access to the LAN.

The user may use the cloud system as a virtual system provided with a plurality of virtual machines. In this case, the security of the virtual system may be ensured.

According to the first embodiment, since the diagnosing server 123 accesses a virtual machine 105 to be diagnosed through a virtual LAN that does not include a virtual machine 105 used by another user, the diagnosing server 123 may diagnose the virtual machine 105 without affecting a cloud service used by the other user.

According to the first embodiment, since an IP address of a virtual machine 105 is translated to an IP address for diagnosis in the network address translation table and the IP address for diagnosis is accessed in the diagnosis process, an impact caused by access unrelated to the diagnosis may be removed and the diagnosis may be appropriately executed.

According to the first embodiment, since a global IP address other than a global IP address of a virtual machine 105 is changed to an IP address for diagnosis, the diagnosis may be executed on the assumption of access to the global IP address from an external.

Second Embodiment

The first embodiment describes the example of the configuration in which the internal FW router is provided for a virtual LAN and located separately from the external FW router. The second embodiment describes an example in which a single FW router inhibits intrusion from an external and routes data in an overall cloud system.

Figure 21:
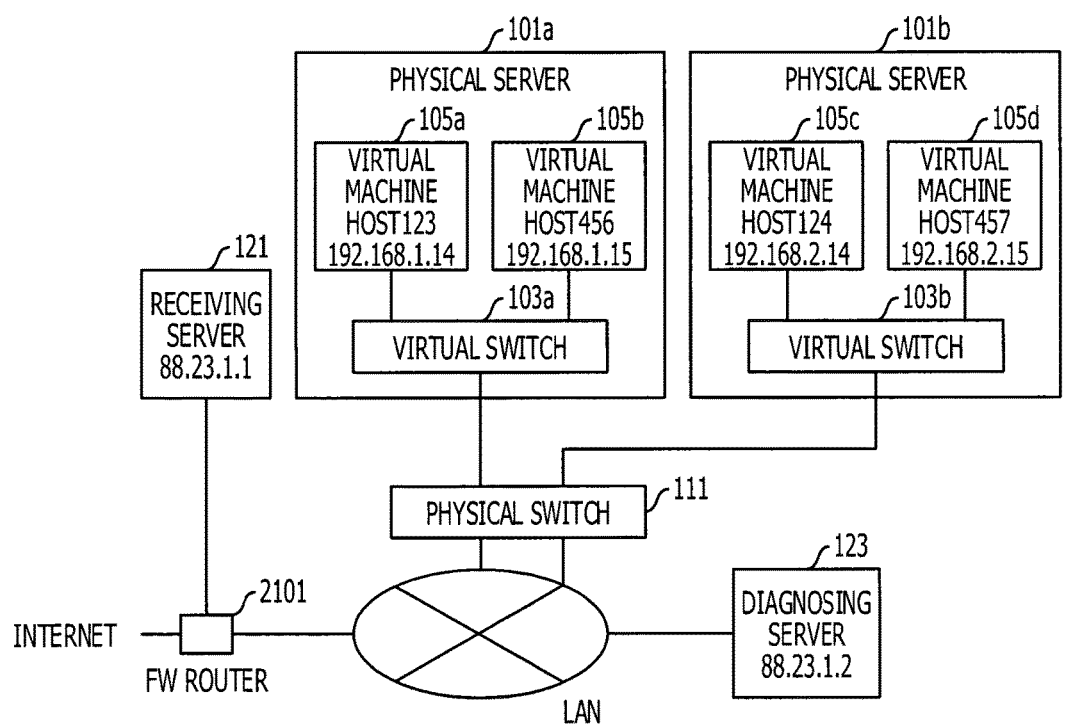
FIG. 21 is a diagram illustrating the outline of a physical network of a cloud system according to the second embodiment.

FIG. 21 illustrates the outline of a physical network of the cloud system according to the second embodiment. The physical server 101*a*, the physical server 101*b*, and the physical switch 111 are the same as those described in the first embodiment. The virtual machine 105*a*, the virtual machine 105*b*, the virtual machine 105*c*, the virtual machine 105*d*, the virtual switch 103*a*, and the virtual switch 103*b* are the same as those described in the first embodiment, In addition, the diagnosing server 123 is the same as that described in the first embodiment. The FW router 2101 that is located at the same position as the external FW router 113 described in the first embodiment routes data in virtual LANs that are operated by users. The receiving server 121 is coupled to the FW router 2101.

Figure 22:
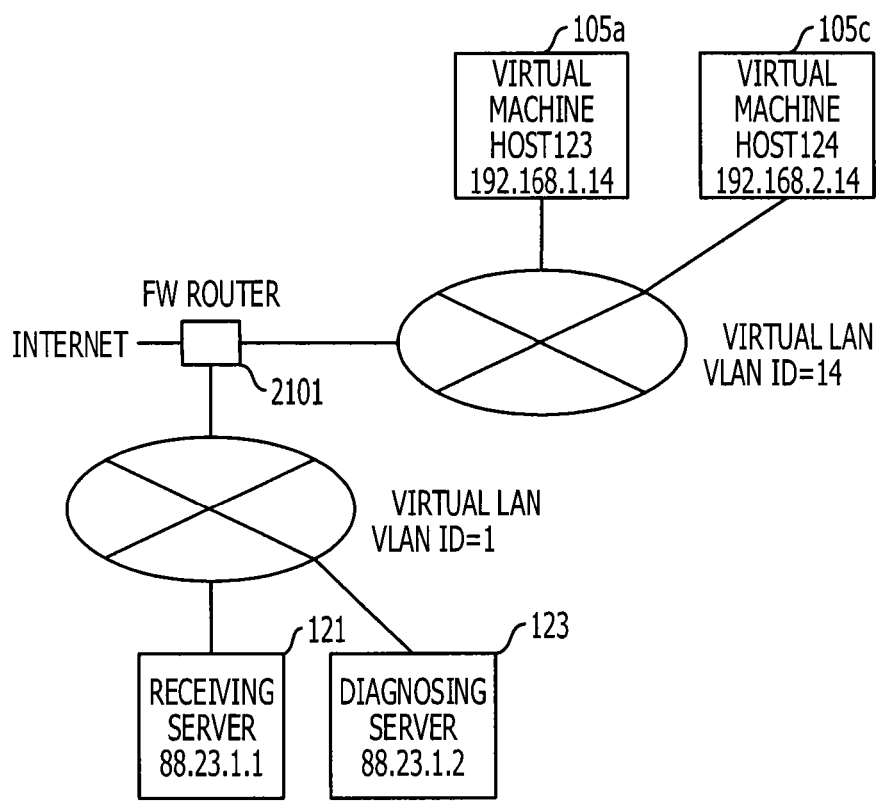
FIG. 22 is a diagram illustrating the outline of a logical network of the cloud system according to the second embodiment.

FIG. 22 illustrates the outline of a logical network of the cloud system according to the second embodiment. In this example, the virtual LAN (with the VLAN ID of 14) that is used by the user is coupled to the FW router 2101. The virtual LAN (with the VLAN ID of 1) that includes the receiving server 121 and the diagnosing server 123 is coupled to the FW router 2101.

In the aforementioned configuration, a request to access a virtual machine 105 is transferred by the FW router 2101, and a response to the access request by the virtual machine 105 is transferred by the FW router 2101.

The DNAT process and the SNAT process are executed by the FW router 2101. The diagnosing server 123 transmits a request to rewrite the NAT table to the FW router 2101. The communication test is executed through the FW router 2101. The diagnosis process is executed through the FW router 2101.

In the network configuration according to the second embodiment, effects that are the same as those described in the first embodiment are obtained.

Although the embodiments of the present technique are described above, the present technique is not limited to the embodiments. For example, the aforementioned functional block configuration may not match the program module configuration.

The configurations of the storage regions are examples and the storage regions may not have the aforementioned configurations. In the process flows, the orders of the processes may be changed as long as the results of the processes are not changed. In the process flows, two or more of the processes may be executed in parallel.

Figure 23:
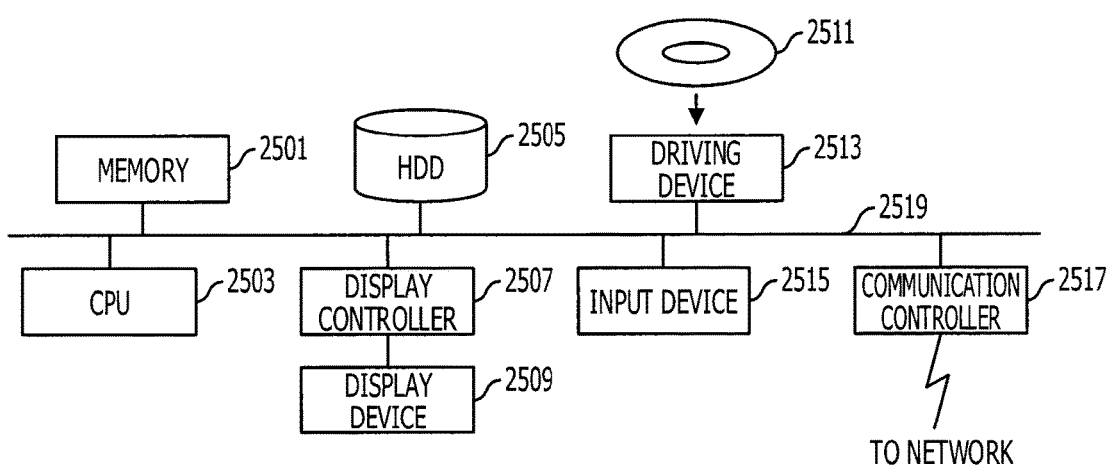
FIG. 23 is a functional block diagram of a computer.

The physical servers 101, the receiving server 121, and the diagnosing server 123 are computer devices. As illustrated in FIG. 23, in each of the computer devices, a memory 2501, a central processing unit (CPU) 2503, a hard disk drive (HDD) 2505, a display controller 2507 coupled to a display device 2509, a driving device 2513, an input device 2515, and a communication controller 2517 are coupled to each other by a bus 2519. The driving device 2513 is provided for a removable disk 2511. The communication controller 2517 is provided for connection to the network. An operating system (OS) and an application program to be used to execute the processes described in the first embodiment are stored in the HDD 2505. In order for the CPU 2503 to execute the operating system and the application program, the operating system and the application program are read from the HDD 2505 into the memory 2501. The CPU 2503 controls the display controller 2507, the communication controller 2517, and the driving device 2513 on the basis of the contents of the processes executed in accordance with the application program and causes the display controller 2507, the communication controller 2517, and the driving device 2513 to execute the specific operations. The data that is used during the processes is stored in the memory 2501, but may be stored in the HDD 2505. In the present embodiment, the application program that is used to execute the processes described above is stored in the computer-readable removable disk 2511, distributed, and installed from the driving device 2513 in the HDD 2505. The application program may be installed in the HDD 2505 through a network such as the Internet and the communication controller 2517. In each of the computer devices, the aforementioned functions are achieved by causing the hardware such as the CPU 2503 and the memory 2501 and the programs such as the OS and the application program to tightly coordinate with each other.

The aforementioned embodiments are summarized as follows.

A diagnosis method according to an aspect that is executed by a diagnosis system configured to provide a cloud service using a virtual machine and arranged in a network to which access is limited includes a process of receiving, from a terminal of a user, an instruction to diagnose the security of the virtual machine that is operated by the user and a process of diagnosing the security of the virtual machine on the basis of access from the outside of the virtual machine in accordance with the instruction.

In this case, since a computer device that is installed in the network to which access is limited diagnoses the virtual machine (or a virtual system including the virtual machine) on the basis of access from the outside of the virtual machine, the computer device may diagnose the security of the virtual machine on the assumption of access from an external without releasing the limit on access to the network.

By executing the diagnosis process in the aforementioned manner, the security of the virtual system that includes the virtual machine may be ensured.

In the diagnosis method, the virtual machine may be accessed through a virtual network that does not include another virtual machine that is used by another user in the diagnosis process.

In this case, the diagnosis may be executed without affecting a cloud service used by the other user.

The diagnosis method may include a process of translating, to an address for diagnosis, an address identifying the virtual machine and included in data indicating a path and held by a router of the network to which access is limited. In the diagnosis method, the address for diagnosis may be accessed in the diagnosis process.

In this case, an impact caused by access unrelated to the diagnosis may be removed and the diagnosis may be appropriately executed.

The data that indicates the path may include an address translation table. The address of the virtual machine may be a global address included in the address translation table and identifying the virtual machine. The address for diagnosis may be a global address other than the global address of the virtual machine.

In this case, the diagnosis may be executed on the assumption of access to a global address from an external.

A program for causing a computer to execute the processes of the method may be created and stored in a computer-readable recording medium or a storage device. The computer-readable recording medium may be a flexible disk, a CD-ROM, a magneto-optical disc, or the like. The storage device may be a semiconductor memory, a hard disk drive, or the like. Results that are obtained during the processes are temporarily stored in a storage device such as a main memory in general.

According to the embodiments, the security may be diagnosed on the assumption of access from an external in accordance with an instruction of a user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
   a first virtual machine;
   a router coupled to the first virtual machine and configured to
   store translation information including a first global address that specifies the first virtual machine and a first private address associated with the first global address; and
   transfer a packet to a destination based on the translation information when the packet is received; and
   a computer coupled to the router, the computer configured to
   diagnose the first virtual machine via the router;
   receive a diagnosis instruction to diagnose the first virtual machine; and
   transmit a rewrite request for rewriting the first global address included in the translation information to a second global address used for diagnosing the security of the first virtual machine, the second global address being different from the first global address, to the router, in response to the diagnosis instruction, wherein
   the router is configured to
   update the translation information stored in the router by rewriting the first global address included in the translation information to the second global address so that the second global address is associated with the first private address in accordance with the rewrite requests; and
   when a test request for executing a communication test is received from the computer, execute the communication test in accordance with the test request, wherein the communication test is executed to confirm whether a communication between the router and the first virtual machine is successfully executed in accordance with the updated translation information; and
   the computer is configured to diagnose the first virtual machine via the router by using the second global address included in the updated translation information.

2. The system of claim 1, wherein
   the first virtual machine is identified in a first network based on the first private address and is identified in a second network based on a second private address, and
   the computer is configured to transmit, to the router, a request that an association between the second private address and the first private address be made in the translation information after the diagnosis of the first virtual machine is terminated.

3. The system of claim 2, wherein the computer is configured to transmit a request to test communication between the router and the first virtual machine based on the second private address after the association between the second private address and the first private address is made in the translation information after the diagnosis of the first virtual machine is terminated.

4. The system of claim 2, wherein
   a second virtual machine coupled to the first network is configured to be accessed through the second network and the router during the diagnosis of the first virtual machine.

5. The system of claim 4, wherein
   the first virtual machine is one of a plurality of virtual machines, and
   communication between the first virtual machine and the second virtual machine is restricted when an identifier associated with the first virtual machine is not associated with an identifier of the second virtual machine.

6. The system of claim 2, wherein the request to diagnose the first virtual machine is received via a third network coupled to the second network.

7. The system of claim 2, wherein the second global address is associated with the first private address in place of the second private address in the router based on the request that an association be made between the third address and the first address.

8. The system of claim 1, wherein the second global address is a global internet protocol address that is disclosed to a limited extent for the diagnosis of the first virtual machine.

9. The system of claim 1, wherein the router is coupled to the computer via a local area network and coupled to the first virtual machine via the local area network.

10. The system of claim 1, wherein the router is coupled to the computer via a first local area network and coupled to the first virtual machine via a second local area network which is different from the first local area network.

11. The system of claim 1, wherein the computer is configured to
diagnose a security status corresponding to the first virtual machine, and
transmit a result of diagnosing of the security status to a terminal device coupled to the computer.

12. The system of claim 1, further comprising:
a server configured to execute the first virtual machine; and
the computer is coupled to the server via the router.

13. A non-transitory computer-readable storage medium including a program that causes circuitry included in a computer to execute a process, the computer being coupled to a router, the router coupled to a first virtual machine, the router configured to store translation information including a first global address that specifies the first virtual machine and a first private address associated with the first global address, the process comprising:
storing, at a router coupled to the first virtual machine, translation information including a first global address that specifies the first virtual machine and a first private address associated with the first global address;
transferring, by the router, a packet to a destination based on the translation information when the packet is received;
updating, by the router, the translation information stored in the router by rewriting the first global address included in the translation information to the second global address so that the second global address is associated with the first private address in accordance with the rewrite requests;
receiving via the computer coupled to the router, a diagnosis instruction to diagnose the first virtual machine;
transmitting a rewrite request for rewriting the first global address included in the translation information to a second global address used for diagnosing the security of the first virtual machine, the second global address being different from the first global address, to the router, in response to the diagnosis instruction;
transmitting a test request to the first virtual machine, wherein the test request executes a communication test to confirm whether a communication between the router and the first virtual machine is successfully executed in accordance with the updated translation information,
terminating the communication test when a response to the test request is received from the first virtual machine via the router; and
diagnosing the first virtual machine via the router by using the second global address included in the updated translation information, after the router updates the translation information stored in the router.

14. A method that causes circuitry included in a computer to execute a process, the computer being coupled to a router, the router coupled to a first virtual machine and the router configured to store translation information including a first global address that specifies the first virtual machine and a first private address associated with the first global address, the method comprising:
storing, at a router coupled to the first virtual machine, translation information including a first global address that specifies the first virtual machine and a first private address associated with the first global address;
transferring, by the router, a packet to a destination based on the translation information when the packet is received;
updating, by the router, the translation information stored in the router by rewriting the first global address included in the translation information to the second global address so that the second global address is associated with the first private address in accordance with the rewrite requests;
receiving via the computer couple to the router; a diagnosis instruction to diagnose the first virtual machine;
transmitting a rewrite request for rewriting the first global address included in the translation information to a second global address used for diagnosing the security of the first virtual machine, the second global address being different from the first global address to the router, in response to the diagnosis instruction;
transmitting a test request to the first virtual machine, wherein the test request executes a communication test to confirm whether a communication between the router and the first virtual machine is successfully executed in accordance with the updated translation information;
terminating the communication test when a response to the test request is received from the first virtual machine via the router; and
diagnosing the first virtual machine via the router by using the second global address included in the updated translation information, after the router updates the translation information stored in the router by rewriting the first global address included in the translation information to the second global address so that the second global address is associated with the first private address in accordance with the rewrite request.

15. The system of claim 1, wherein
the computer is configured to transmit a restore request for restoring the translation information to the router when the diagnosing is completed, and
the router is configured to restore the translation information by rewriting the second global address included in the translation information to the first global address so that the first global address is associated with the first private address in accordance with the restore request.

16. The system of claim 1, further comprising:
a terminal device configured to transmit authentication information for authenticating a user; and
a reception server coupled to the terminal device and configured to:
receive the authentication information;
authenticate the user using the received authentication information; and
transmit data of diagnosis screen to the terminal device when the user is successfully authenticated, wherein
the terminal device is configured to transmit the diagnosis instruction to the reception server through the diagnosis screen, and
the reception server is configured to transfer the diagnosis instruction to the computer together with virtual local area network (LAN) information related to the first virtual machine.

17. The system of claim 16, wherein
the computer is configured to receive the virtual LAN information including information on a virtual machine permitted by a user and a virtual LAN that includes the virtual machine, and
transmit the rewrite request to the router based on the received virtual LAN information.

18. The system of claim 1, wherein
the test request includes the second global address, and
the executing of the communication test includes:

translating, by the router, the second global address to the first private address based on the translation information, transmitting a request for the communication test including the first private address to the first virtual machine, and determining that the communication test is succeed when a response to the request is received from the first virtual machine.

19. The system of claim 11, wherein the terminal device is configured to display the result on a diagnosis screen of the terminal device.

20. The system of claim 15, wherein the computer is configured to:

transmit an access request including the first global address to the router, and determine that the communication test is successful when a response to the access request is received from the first virtual machine via the router.

* * * * *